United States Patent [19]

Huisinga et al.

[11] Patent Number: 4,683,811
[45] Date of Patent: Aug. 4, 1987

[54] RIDGE VENTILATOR DOOR

[75] Inventors: Richard D. Huisinga; Rayburn E. Norling, both of Willmar, Minn.

[73] Assignee: Willmar Poultry Company, Inc., Willmar, Minn.

[21] Appl. No.: 798,993

[22] Filed: Nov. 18, 1985

[51] Int. Cl.⁴ .............................................. F24F 7/02
[52] U.S. Cl. ...................................... 98/42.2; 49/118; 98/42.19
[58] Field of Search .................. 49/36, 118, 122, 340, 49/344; 98/42.19, 42.2

[56] References Cited

U.S. PATENT DOCUMENTS

| | | | |
|---|---|---|---|
| 1,410,314 | 3/1922 | Hyatt | 49/118 X |
| 1,618,792 | 2/1927 | Wood et al. | 98/42.2 X |
| 1,850,793 | 3/1932 | Hawes . | |
| 2,232,027 | 2/1941 | Gunter | 98/42.2 X |
| 2,685,247 | 8/1954 | Bell, Jr. | 98/42.2 X |
| 2,766,859 | 10/1956 | Urquhart . | |
| 2,895,399 | 7/1959 | O'Hea | 98/42.19 |

FOREIGN PATENT DOCUMENTS 2314096  10/1973  Fed. Rep. of Germany ........ 49/122

Primary Examiner—Harold Joyce
Attorney, Agent, or Firm—Palmatier & Sjoquist

[57] ABSTRACT

A ridge ventilating device that allows for the passive ventilation of agricultural buildings and the like, and which device resists the affects of snow or ice and allows for regulation of the flow of air from the building. Pairs of hinged door panels which operate by opening and closing coincidentally with each other, thereby covering and uncovering an elongate ridge passage cut into the ridge or peak of the roof structure. The doors are hingedly attached along the outside edges of the passage so that they open away from each other and create an unobstructed opening in the roof for the air to exhaust through. Each door is pivotally attached to a connecting link which connecting links are in turn connected at a common pivot point to the shaft of a dual-acting air cylinder. The air cylinder thus provides the motion for opening and closing the doors. The air cylinder is attached to a mounting plate, the mounting plate providing for securing of the air cylinder and the connecting apparatus to the interior roof structure of the building. The air cylinder is pivotally attached to the mounting plate so that each door can be opened independently of the other in the event that one of the doors becomes frozen shut due to the affects of snow or ice. The connecting links herein include a stopping edge for preventing the over-extension of the piston shaft in the event that one door is opened independently of the other thereby providing for the continued application of opening force to the closed door.

10 Claims, 8 Drawing Figures

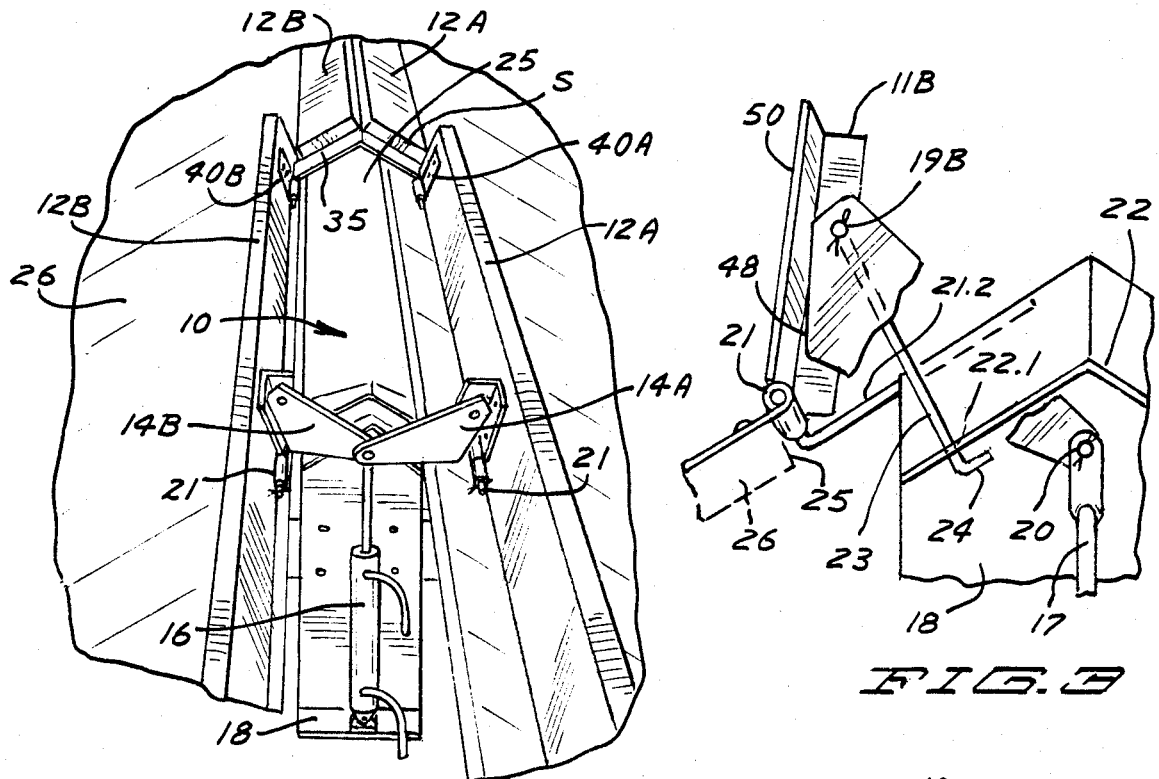
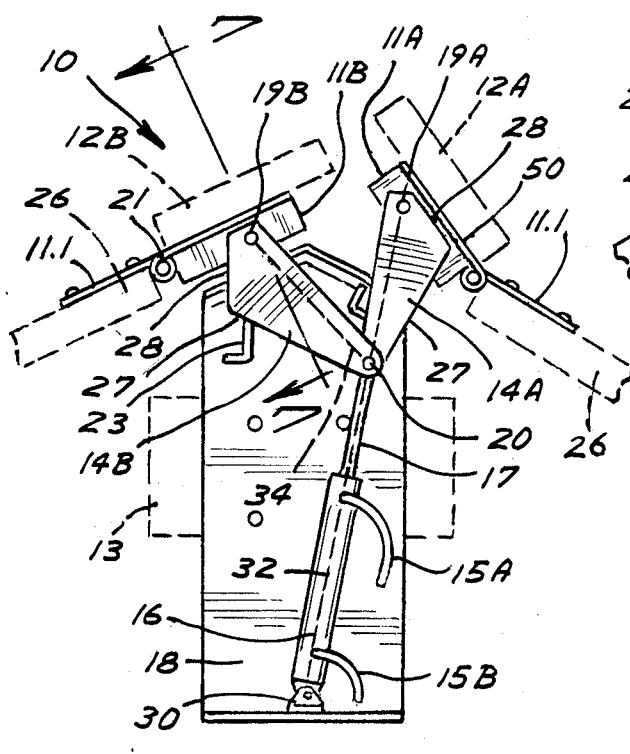
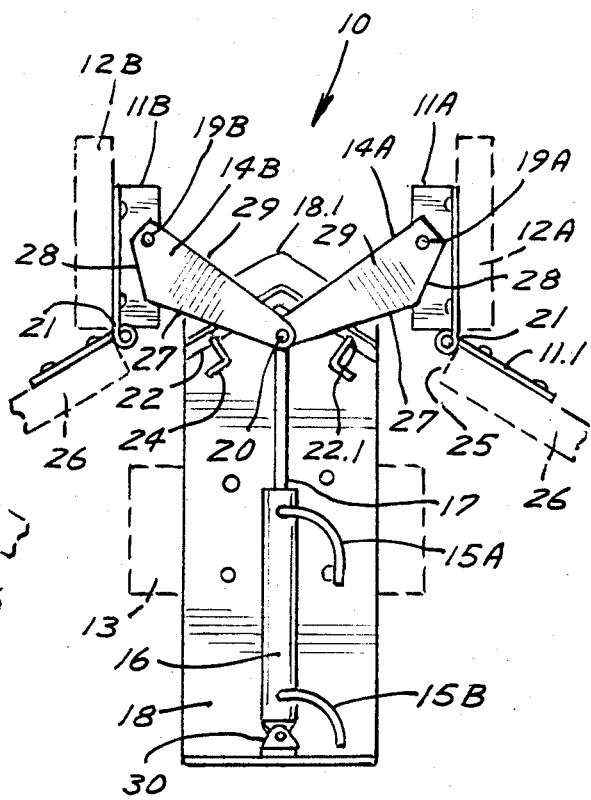

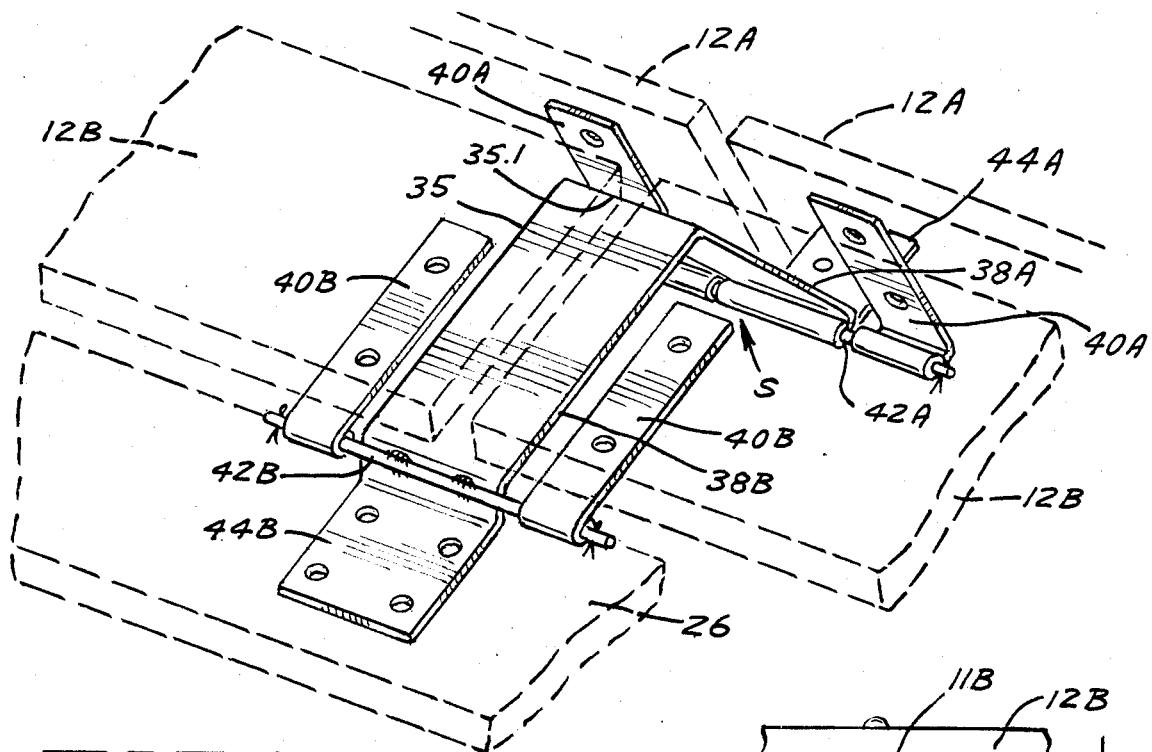
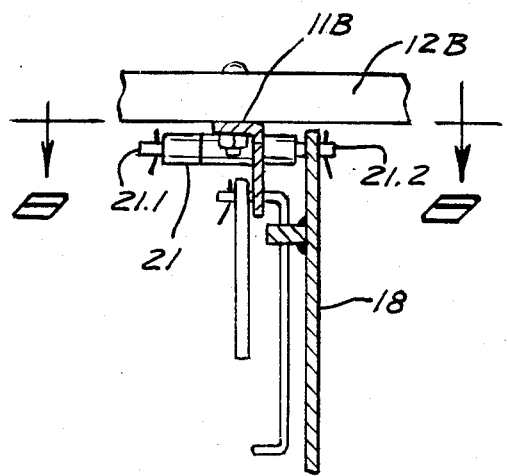
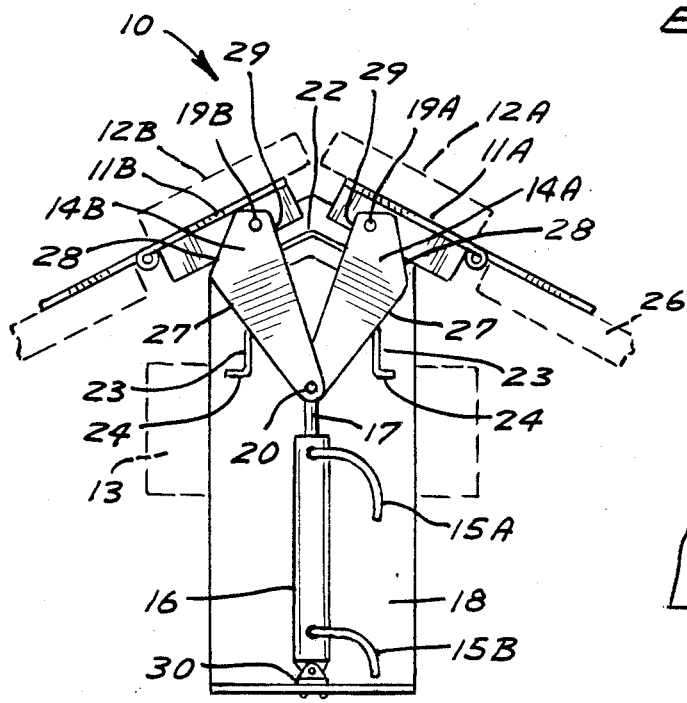
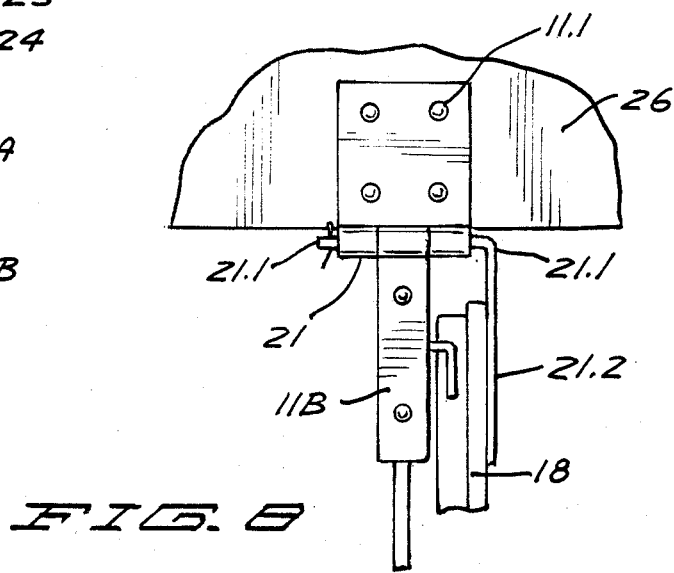

RIDGE VENTILATOR DOOR

BACKGROUND OF THE INVENTION

1. Field of the Invention

The present invention relates generally to devices for ventilating buildings, and in particular to such devices used to ventilate agricultural buildings used for the housing of livestock.

2. Background

Agricultural buildings used for the housing and raising of livestock, and in particular poultry, generally require ventilation to control, among other factors, temperature, humidity and air quality. Most ventilation systems are active, that is, they use a motorized mechanism, such as a fan or fans to exhaust the "old air" and replace it with fresh outside air. Passive systems are also used and have the advantage, as compared to active systems, of not requiring the expenditure of additional energy to accomplish the needed air exchange.

Passive systems rely upon the natural convective flow of air that results from the temperature differential that exists between the warm interior building air and the cooler air outside of the building. Passive systems generally include exhaust vents, typically located on the roof of the structure, to exhaust the warm interior air as it rises, and intake vents, generally located on the exterior walls of the building, that permit the replacement of the warm interior air by the cooler outside air.

In northern climates, due to their location on the roof, exhaust vents can become blocked or frozen shut with snow or ice, which blockage thus, prevents air exchange. In addition, as passive systems are essentially dependent upon natural conditions to provide for air flow and exchange, and as such air flow can be greater than, or less than the optimum flow rate that may be desired at a particular point in time, it is important that a passive system include means for regulating the rate of air flow to the extent permitted by the natural conditions.

Accordingly, it would be desirable to have a passive ventilation system the effectiveness of which is not easily compromised by the effects of snow and ice. It would also be desirable to have such a passive ventilating system that provides for the regulation of air exchange.

SUMMARY OF THE INVENTION

The present invention consists of a ridge ventilating device that allows for the passive ventilation of agricultural buildings and the like, and which device resists the effects of snow and ice by permitting the opening of either door independently of the other, and allows for regulation of the flow of air from the building.

The present invention includes pairs of hinged door panels which operate by opening and closing coincidentally with each other, thereby uncovering and covering an elongate ridge passage cut into the ridge or peak of the roof structure. The doors are hingedly attached along the outside edges of the passage so that they open away from each other, and thus create an unobstructed opening in the roof for the air to exhaust through.

Each door is pivotally attached to a connecting link which connecting links are in turn connected at a common pivot point to the piston shaft of a dual-acting air cylinder. The air cylinder is attached to a mounting plate, the mounting plate providing for securing of the cylinder to the interior roof structure of the building. Thus, extension of the piston shaft opens the door panels coincidentally with each other, thereby uncovering the ridge passage through which passage the exhaust air flows from the building. In addition, as the air cylinder can be operated in both directions the door panels can be set at any position between fully closed and fully opened. In this manner, the invention herein can regulate air exchange as a function of the size of the exhaust opening between the door panels.

In the present invention, each door can be opened independently of the other. Independent opening is desirable wherein, if one door is frozen shut as the result of ice or snow buildup, the other door can be opened to provide for some ventilation. In the invention herein, the air cylinder is pivotally attached to the mounting plate so that in the event that one door panel is frozen shut the cylinder can swing away from the closed door towards the operable door. This swinging motion increases the amount of force normally applied to the operable door by the cylinder, and provides for a pivoting motion of the link attached to the closed door, which motion allows for opening of the operable door. In addition, both of the connecting links are triangular in shape and include a stopping edge or heel. In the situation where one door is opened independently of the other, the heel of the connecting link attached to the operable door prevents that door from opening as fully as possible. In other words, when one door is opened independently of the other, the stopping edge of that operable door's connecting link prevents it from opening as widely as is possible when both doors are opened coincidentally. If the operable door were allowed to open as fully when operated independently, the air cylinder shaft would be allowed to extend to such a position that the air cylinder would no longer be able to apply sufficient force to the closed door to urge it open as the snow or ice melts, or to operate it once broken free. The stopping edges therefore prevent this over extension of the air cylinder shaft and thereby provide for the continued application of pressure to the closed door. The closed door under the constant force of the extensive pressure of the air cylinder can then eventually be broken loose of the ice and/or snow, as such ice or snow typically will quickly melt due to the heat of the sun and the interior heat of the building.

The present invention also includes end supports attached to the roof of the building for supporting the door panel ends and for providing sealing of the door panel ends when they are closed against the roof, thus preventing air flow therearound.

It is therefore an advantage of the present invention to provide for a ridge ventilating device that allows for regulated passive ventilation of a building structure.

It is also an advantage of the present invention to provide for a ridge ventilating device that is resistant to the compromising affects of the snow and ice.

BRIEF DESCRIPTION OF THE DRAWINGS

The foregoing and other objects and advantages of the present invention will become apparent from the following specification and claims with reference to the appended drawings in which:

FIG. 1 shows a front view of the actuating unit wherein both doors are in the fully opened position.

FIG. 2 shows a front view of the actuating unit wherein both of the doors are fully closed.

FIG. 3 shows an enlarged view of the upper portion of the actuating unit.

FIG. 4 shows a perspective view of the present invention in place in a roof of a building, as viewed from above the outside of the roof.

FIG. 5 shows a perspective view of the door end support.

FIG. 6 shows a front view of the actuating unit with one door open independently of the other.

FIG. 7 shows a detail section view at 7—7 of FIG. 6.

FIG. 8 shows a detail section view taken at 8—8 of FIG. 7.

DESCRIPTION OF THE PREFERRED EMBODIMENTS

One form of the present invention is illustrated in the drawings and is described herein.

The roof 26 of the barn is slanted in both directions away from an apex area in which a ventilating opening 25 is formed. The opening in the roof is elongate, along the entire ridge area or apex area of the roof; and the roof structure 26, in general, is supported by support joists 13, rafters beneath the roof boards and, in some structures, trusses will be used, but arranged in such a way that the ventilator openings 25 will be open and unobstructed along substantial length of the roof.

Elongate door panels 12A and 12B extend along the ventilating opening 25 in the roof and serve to close the opening and alternately, to open the ventilating opening. In FIG. 4, a pair of door panels 12A and 12B are illustrated in closed condition and another pair of door panels 12A and 12B are illustrated in open condition.

The door panels 12A and 12B are supported from adjacent portions of the roof or roof boards 26 by end supports, indicated in general by the letter S. One such end support is provided at each end of each pair of door panels 12A and 12B, and each of the end supports S will support the ends of doors adjacent each other in end to end relation. As illustrated in FIG. 4, the end support S supports both pairs of door panels 12A and 12B, one pair of which is illustrated closed and the other pair of which is illustrated open. Each of the door end supports S includes an elongate stationary support plate 35, which spans the ventilating opening 25 and has its opposite ends 44A and 44B lying on and affixed to the adjacent areas of the roof 26, as by bolts or lag screws. The plate 35 is bent at 35.1 as to define support panels 38A and 38B which are obliquely oriented with respect to each other and which conform to the slope of the adjacent roof areas 26. The plate 35 has sufficient width as to underlie the adjacent end areas of end to end related door panels, so as to adequately support these door panels when the door panels are in closed condition.

It will be recognized that the mounting panels 44A and 44B of the plate 35 are offset downwardly with respect to the support panels 38A and 38B, so that the mounting panels 44A and 44B may underlie the roof boards 26 adjacent the bent opening 25 at the ridge or peak of the roof. The support S also includes a pair of hinge pins or rods 42A and 42B, which are respectively affixed as by welding, to the plate 35, adjacent the outer ends of panels 38A, 38B where the plate 35 is offset and connected to the mounting panels 44A, 44B.

The hinge pins 42A, 42B each carry a pair of door mounting hinging panels 40A, 40B which are apertured and bolted to the door panels 12A, 12B for swingably mounting the door panels and facilitating movement of the door panels between open and closed positions.

The door assembly includes a means for opening and closing the doors 12A and 12B, and such means, as illustrated, comprise an actuating unit designated in general by numeral 10 and located at an intermediate location between the ends of the doors 12A, 12B.

Each of the actuating units 10 has a pair of angle iron brackets 11A, 11B respectively bolted to doors 12A, 12B and extending transversely across the doors. Each of the brackets is connected to a mounting plate 11.1 which overlies the adjacent roof board 26 and is bolted thereto. Each of the mounting brackets 11A, 11B is connected to the respective mounting plate 11.1 by a hinge 21, which includes a hinge pin 21.1. One end of the hinge pin 21.1 has a retaining cotter pin therein; and the other end of the hinge pin has an elongate end 21.2 which is bent to extend parallel to the brace 11A, 11B. The end portion 21.2 of the hinge pin or rod is affixed as by welding to a mounting plate or frame plate 18. The frame plate 18 is rigid and is affixed, as by bolts, to the joist 13 or supporting structure of the roof. The upper end portion of the frame plate 18 extends into the vent opening 25 of the roof, and its upper edge 18.1 is formed at the same oblique angle as assumed by the doors in closed position so that the top of the frame plate 18 is closely spaced to the inside of the doors 12A, 12B.

It will be recognized that the door mounting brackets 11A, 11B and the hinges 21 are secured to both the roof structure 26 and to the mounting plate 18, by mounting plates 11.1 and the end of hinge rod 21.2, respectively. As a result, the movement and swinging of these door mounting brackets 11A, 11B may be closely controlled.

The actuating unit 10 includes means for swinging the brackets 11A, 11B about the hinges 21 and such means include a pneumatically operated cylinder 16 with its piston rod 17 connected through swinging links 14A, 14B to the mounting brackets 11A, 11B. Air pressure, controlled by a suitable valving arrangement, is supplied to the cylinder by hoses 15A, 15B. A mounting bracket pivotally or swingably mounts the lower end of the cylinder 16 to a base flange of the mounting plate 18 so that the cylinder 16 may be tilted from side to side as illustrated in FIGS. 1 and 6.

The connecting links 14A, 14B are formed of heavy gauge steel plate and each of the links has a generally triangular shape. Link 14A is swingably connected to the mounting bracket 11A by a pivot pin 19A; and link 14B is swingably connected to the mounting bracket 11B by a pivot pin 19B. A single connecting pin 20 pivotally connects the end of the piston rod 17 to the lower ends of both of the links 14A, 14B.

The triangular shape of the links 14A, 14B is important to the operation of these links under certain circumstances and it will be noted that each of the links has three elongate edges 27, 28, 29. The edge 28 may be considered an engagement heel, adjacent the pins 19A, 19B and confronting the base flanges of the angle iron mounting brackets 11A, 11B. The edge or heel of each of the mounting brackets 14A, 14B is oriented at an acute angle to a line which extends from the pivot pin 20 to the adjacent pivot pin 19A or 19B; and the edge or heel 28 is disposed along the bracket 11A, 11B, between the adjacent mounting pin 19A, 19B and the hinge 21 for the mounting bracket.

As illustrated in FIG. 3, the pivot pins 19A, 19B, which connect the triangular links to the door mounting brackets, and extend through aligned apertures in the links and brackets, are connected to and formed integrally of elongate stop rods 23. A rigid and stationary stop bar 22 is affixed, as by welding, on frame plate 18 and has bearing aperatures 22.1 therein through which the stop rods 23 extend. Stop rods 23 have stops or enlargements 24 on the lower ends thereof, formed by bending the rod at a sharp angle to prevent the rod from slipping through the openings 22.1 in the stop bar.

In the operation of the door assembly, in the normal operation, the doors 12A and 12B are swingable between closed position, as illustrated in FIG. 2 and open position, as illustrated in FIGS. 1 and 4. Operation of the door between closed and open position is affectuated between pneumatic cylinder 16; and when the cylinder has its piston rod 17 retracted, the doors are in closed position, and when the piston rod is extended, the doors are in open position. The operation of the pneumatic cylinder may be controlled remotely by controlling the air supplied through hoses 15A, 15B, as by solenoid valves or other electromechanical valving, the operation of which may be controlled by numerous types of control systems, including computers.

It will be recognized that as the piston rod 17 is extended from the position in FIG. 2 to the position in FIG. 1, thrust is asserted by the piston rod to the links 14A, 14B and the thrust is transmitted to the mounting brackets 11A, 11B and then through the doors for opening the doors. As the piston rod is extended, and as the doors swing open, the links 14A, 14B swing outwardly to a wide angle.

The pneumatic pressure may be continued in the cylinder 16 to hold the doors in the open condition. In addition, it has been found that the degree to which the doors are opened may be varied as to vary the size of the actual ventilating opening between the doors 12A, 12B. More specifically, the cylinder 16 may be extended to an intermediate position so that the doors are simply opened about halfway; and the doors may be held in this position by controlling the pressure applied to the cylinder 16.

When the doors are to be closed, the cylinder 16 is operated by air supplied, to retract the piston rod 17 which will assert tension on the links 14A, 14B and pull the doors 12A, 12B downwardly. When the doors are pulled downwardly, they will fit snugly together at their upper or inner edges, and the opposite edges of the doors will fit snugly along the roof 26. The ends of the doors swing on the hinge panels 40A, 40B and when closed, will lie flush against the panels 38A, 38B of the support plate 35. Any gap between the confronting end edges of adjacent doors is closed by the plate 35 against which the doors lie.

In certain instances, the operation of one of the doors 12A, 12B may be impeded or swinging of the door may be obstructed for one reason or another. For instance, in northern climates, the roof 26 may carry a substantial snow load and in some instances, the roof may be ice covered as a result of freezing rain. Generally, one roof door 12A or 12B will be somewhat looser than the other, so that it may be opened. For instance, by heat of the sun, snow and ice may be melted away on one side of the roof, which faces generally a southerly direction. When one of the door panels, such as 12A, is free to open, while the other roof door 12B remains stuck and will not move, the actuator 10 may be operated to open at least the one door that is free to open. As illustrated in FIG. 6, the cylinder may be operated to extend the piston rod, and although the door 12B is immovable, the cylinder 16 may be tilted on its mounting 30 as the rod extends and opening pressure is exerted against the door 12A. As this occurs, the link 14B which is attached to door 12B, swings slightly. The link 14A also swings slightly about the attachment pivot 19A by which it attachs to door bracket 11A and door 12A, until the heel edge 28 of the link comes into contact with the top flange 50 of the door bracket 11A. The link 14A is thereby prevented from swinging counterclockwise about the pivot 19A and relative to the door bracket 11A. As pressure is maintained in the cylinder 16, tending to further extend the piston rod 17, force is continued to be exerted from pin 20 and through link 14B, tending to open the door 12B. When the obstruction, such as ice, is removed from door 12B, the continuously applied pressure exerted from cylinder 16 will cause the door 12B to open. It will be recognized however that in order to continue to maintain pressure through link 14B tending to open door 12B, the presence of the heel edge 28 on link 14A is essential to the operation.

When the doors are both swung to their open position, as illustrated in FIG. 1, the stop rods 23 have moved through the apertures in the stop bar 22 and when the stop 24 at the end of the rod 23 bears against the stop 22, the doors will stop and remain in that open position.

It will be seen that the present invention provides a ridge door assembly for opening and closing a ridge vent in a building, accommodating mounting of the doors at its ends, and providing for opening and closing of the doors by an actuating unit 10. The actuating unit has a pneumatic cylinder with an extensible and retractable piston rod which is connected by triangular links to the bottom side of the doors so that the doors will be open and closed as the piston rod is extended and retracted from the cylinder. The connecting links between the piston rod and the door brackets are triangular shaped and provided with a heel edge which confronts the bottom side of the adjacent door and the bracket for the door, and when one of the doors is stuck, the link operating the other door will swing so that the heel will bear against the bottom side of the door or the bracket and the door which is openable will stop at an intermediate location while pressure is continued against the other door through its attachment link to the pneumatic cylinder.

What is claimed is:

1. A ridge ventilating device for regulating air flow through a ridge passage in the roof of a building, which comprises:
 (a) first and second elongate opposed door panels on parallel hinges for attachment to the roof of the building;
 (b) an elongate actuating unit depending from the door panels and having a mounting pivot for attachment to the interior roof structure of the building, the elongate actuating unit having a pair of elongate upright connecting links with upper ends each pivotally connected to one of the doors, and with lower ends pivotally connected together by a common pivot by which upward thrust may be imparted to the links, the actuating unit having elongate extensible and retractable means with an upper end connected to said common pivot and a lower end connected to said mounting pivot to open and close said doors in response to extension and retraction of said extensible and retractable means.

2. The ridge ventilating device as defined in claim 1, wherein said extensible and retractable means comprises a pneumatic cylinder.

3. The ridge ventilating device as defined in claim 1 wherein the mounting pivot and connecting pivot have axes parallel to said hinges.

4. The ridge ventilating device as defined in claim 1, which further comprises, door panel stops, attached to each of the door panels, for limiting the travel of each door panel to a fully opened position.

5. The ridge ventilating device as defined in claim 4 wherein, the connecting links each have a stopping edge for contacting with the doors for preventing over-extension of the actuating means when either door is opened independently of the other, so that a pressure is continually applied to the closed door.

6. The ridge ventilating device as defined in claim 5 wherein, the actuating means consists of a dual-acting pneumatic cylinder.

7. The ridge ventilating device as defined in claim 6 wherein, the connecting links are essentially, triangular in shape.

8. The ridge ventilating device as defined in claim 7 wherein, the doors are hingedly attached to the mounting plate.

9. A ridge ventilating device for regulating air flow through a ridge passage in the roof of a building, which comprises:
 (a) first and second elongate opposed door panels,
 (b) an actuating unit, having a mounting plate for attachment of the unit to the interior roof structure of the building, and the actuating unit including a pair of connecting links, each link pivotally connected on one end to one of the doors and the opposite end of each of the connecting links pivotally connected at a common pivot point to the shaft of dual-acting pneumatic cylinder, the pneumatic cylinder imparting extensive and retractive motion to the doors through the connecting links so that the door panels are opened and closed respectively thereby, and the pneumatic cylinder pivotally attached to the mounting plate on one end opposite the point of attachment to the connecting links so that either door can be opened independently of the other, and the connecting links each having a stopping edge for contacting with the doors for preventing over-extension of the piston shaft when either door is opened independently of the other,
 (c) end supports secured to the roof and having flat angled surfaces for close cooperation with the ends of the door panels for supporting the door panel ends when the doors are in the closed position, and the support surfaces for preventing air flow around the door panel ends when the doors are in the closed position and the doors hingedly attached to the end support,
 (d) door panels stops, attached to each of the door panels for limiting the travel of each door panel to the fully opened position.

10. The ridge ventilating device as defined in claim 9 wherein, the connecting links are essentially triangular in shape.

* * * * *